US012037222B2

(12) United States Patent
Iotti

(10) Patent No.: US 12,037,222 B2
(45) Date of Patent: Jul. 16, 2024

(54) TELEHANDLER WITH IMPROVED WINCH

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

(*) Notice: Subject to any disclaimer, the term of this patent is extended or adjusted under 35 U.S.C. 154(b) by 1 day.

(21) Appl. No.: 17/900,454

(22) Filed: Aug. 31, 2022

(65) Prior Publication Data

US 2023/0150800 A1 May 18, 2023

(30) Foreign Application Priority Data

Sep. 6, 2021 (IT) ........................ 102021000022928

(51) Int. Cl.
*B66C 13/04* (2006.01)
*B66C 23/42* (2006.01)

(52) U.S. Cl.
CPC .............. *B66C 13/04* (2013.01); *B66C 23/42* (2013.01); *B66C 2700/0357* (2013.01)

(58) Field of Classification Search
CPC ......... B66C 13/04; B66C 13/18; B66C 13/22; B66C 23/10; B66C 13/08; B66C 2700/0357
See application file for complete search history.

(56) References Cited

U.S. PATENT DOCUMENTS

| | | | | |
|---|---|---|---|---|
| 11,434,113 | B2 * | 9/2022 | Hayashi | B66C 23/12 |
| 2018/0112425 | A1 * | 4/2018 | Logan | E04G 23/002 |
| 2020/0148518 | A1 * | 5/2020 | Iotti | B66F 9/06 |
| 2020/0180916 | A1 | 6/2020 | Iotti | |
| 2020/0223670 | A1 * | 7/2020 | Kanda | B66C 13/063 |
| 2020/0247647 | A1 * | 8/2020 | Kanda | B66C 13/18 |
| 2020/0407989 | A1 * | 12/2020 | Logan | B66F 9/0655 |
| 2021/0221655 | A1 * | 7/2021 | Hayashi | B66C 1/48 |
| 2022/0204324 | A1 | 6/2022 | Cadou et al. | |

FOREIGN PATENT DOCUMENTS

| | | | |
|---|---|---|---|
| EP | 3666720 | A1 | 6/2020 |
| EP | 3736245 | A1 | 11/2020 |
| JP | H0873183 | A | 3/1996 |

OTHER PUBLICATIONS

Manitou; Attachment Catalog—Jun. 2018—Manitou Handling Your World, 168 total pages.

* cited by examiner

*Primary Examiner* — Michael R Mansen
*Assistant Examiner* — Juan J Campos, Jr.
(74) *Attorney, Agent, or Firm* — Pearne & Gordon LLP; J. Gregory Chrisman

(57) ABSTRACT

Described is a telehandler (1) comprising an operating arm (10) to which is coupled a winch (2) equipped with a motor-driven drum (21), on which is wound a cable (22) to which is fixed a hook (23), also comprising first means (51) for detecting the quantity of cable (22) unwound.

6 Claims, 4 Drawing Sheets

TELEHANDLER WITH IMPROVED WINCH

This invention relates to telehandlers equipped with an improved winch. There are prior art telehandlers consisting of a vehicle having a frame or "carriage" movable on wheels, equipped with a drivers cab and an operating arm which can be extended telescopically, which can be positioned directly on the carriage or on a rotatable platform mounted on the carriage.

At the distal end of the arm there is an attachment device to which an apparatus for lifting or moving loads can be removably coupled; one of these apparatuses is the winch.

It is often the case in building sites that the operators must move the load hooked to the winch within precise spatial limits or to prevent interference with elements of the surrounding environment or for reasons of practicality, or it may be the case that they must perform repetitive operations with the winch.

It is therefore a long-term and keenly-felt need in the market to improve efficiency and make it easier for the operator of a telehandler to use the winch in activities which are subject to limitations due to the context in which they are carried out.

The technical purpose forming the basis of the present invention is to provide a telehandler equipped with a control system of the movements which satisfies the above-described need.

The specified aim is attained by the invention made according to claim 1.

Further characteristics and advantages of the present invention will become more apparent in the non-limiting description of a preferred but non-exclusive embodiment of the proposed telehandler, as illustrated in the accompanying drawings, in which.

Figure 1:
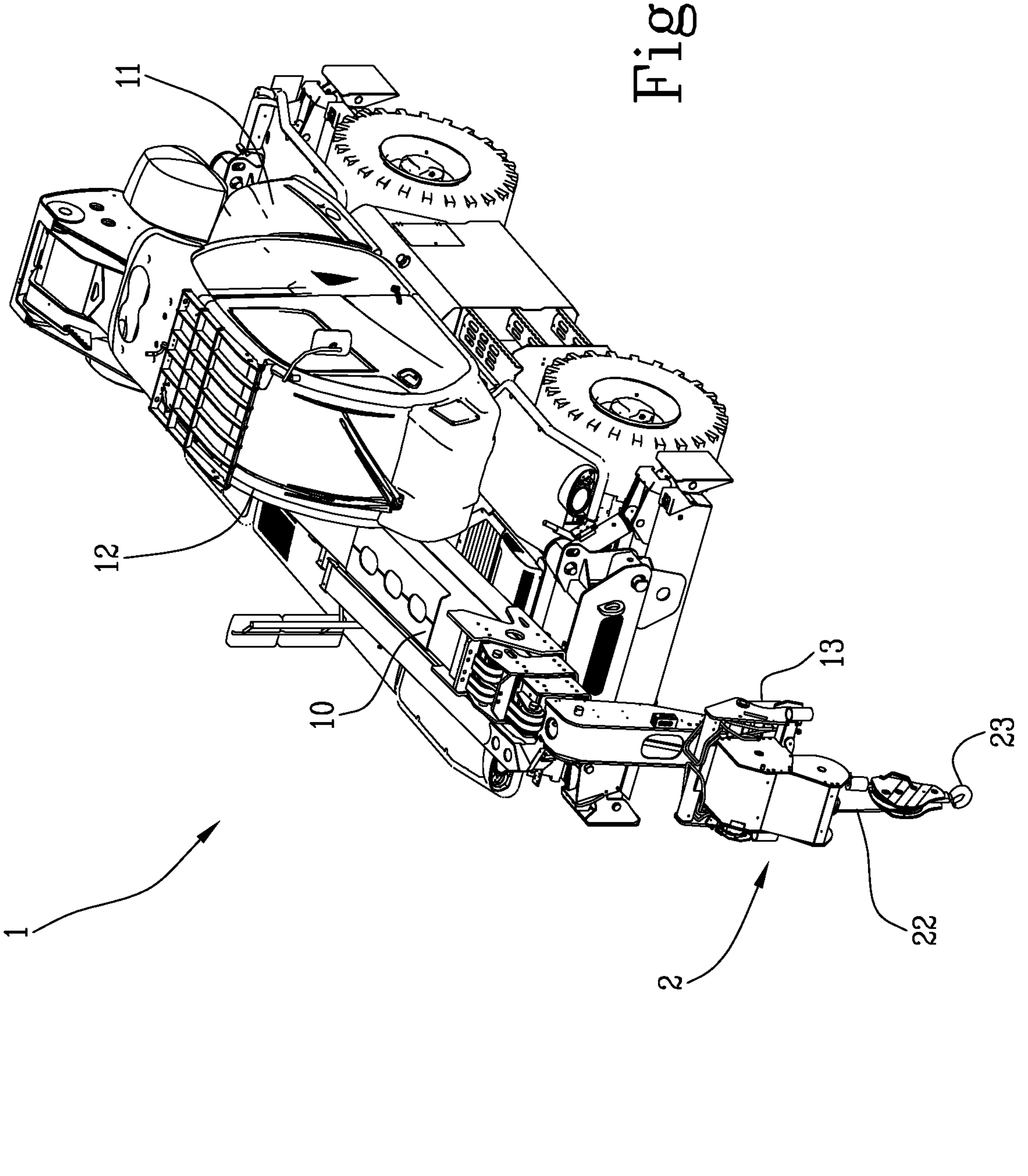
FIG. 1 is an axonometric view of a telehandler according to the invention.

With reference to the accompanying drawings, the numeral 1 denotes in its entirety a telehandler according to the invention.

The drawings show a rotary telehandler 1, equipped with a telescopic lifting arm 10 mounted on the rotatable platform 11, which also has the driver's cab 12, the arm 10 being equipped, at its distal end, with a winch 2 equipped with a motor-driven drum 21, on which is wound a cable 22 to which is fixed a hook 23, to which a load to be moved can be attached.

However, it should be noted that the invention can be used with a different type of telehandler 1, for example of the fixed type.

Still more in detail, the arm 10 may have, at its end, an attachment device 13, also of the type normally in use in the telehandlers 1 manufactured by the Applicant, which allows the replacement of the winch 2 with another apparatus and its connection to the hydraulic and electronic apparatuses of the telehandler 1.

The arm 10 is hinged to the rotary platform 11, so as to be able to oscillate vertically, on the actuation of a hydraulic cylinder 101 (schematically illustrated in FIG. 4), or a similar actuator, between a lower position, substantially horizontal, and an upper position wherein the arm 10 is close to the vertical.

The arm 10 is extensible and retractable and, more precisely, comprises a plurality of segments inserted one in the other, coaxial with one another and designed to translate along the axial direction.

Figure 4:
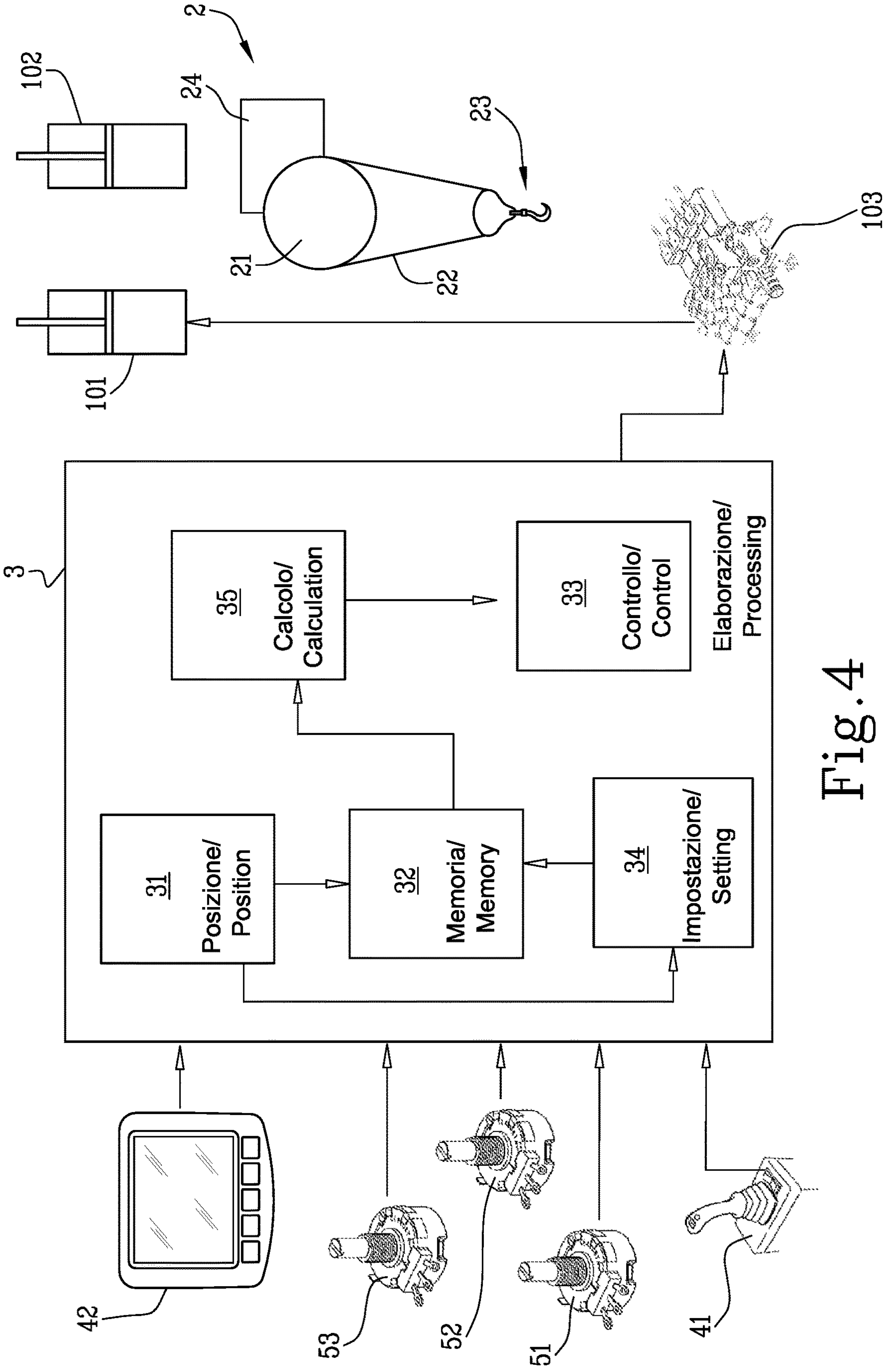
FIG. 4 is a diagram representing the processing unit according to the invention.

The elongation and retraction of the arm 10 are also produced by one or more hydraulic cylinders 102, or other actuators (see FIG. 4).

The rotation of the platform 11 is also produced by a preferably hydraulic actuator, associated for example with a rack, and the motor 24 which drives the drum 21 of the winch 2 is also preferably hydraulic.

The telehandler 1 also mounts an electro-hydraulic distributor 103 to which the above-mentioned actuators 101, 102, 24 are connected, including the motor 24 of the winch 2, according to known methods.

In practice, the telehandler 1 includes processing unit 3, that is, a control unit 3, which transmits control signals to the distributor 103 which consequently controls the actuators 101, 102, 24, in such a way that they actuate the arm 10, the tower 11 and the winch 2 according to the commands given by the operator who sits in the cabin.

In practice, the telehandler 1 according to the invention includes a known control system equipped with commands in the cab, such as joystick 41, pedals, pushbuttons, etc., actuated by the operator; by acting on the commands 41, the control unit 3 generates signals received from the distributor 103, which then adjusts the operation of the actuators 101, 102, 24 of the arm 10, the winch 2 and the platform 11.

The control unit 3 also includes a known safety system which limits or prevent movements of the arm 10 or activities of the winch 2 which can lead to a risk of overturning, taking into account the weight of the suspended load, the position and degree of elongation of the operating arm 10 and the configuration of the telehandler 1.

According to an important aspect of the invention, the telehandler 1 comprises first means 51 for detecting a quantity of cable 22 of the winch 2 unwound by its drum 21.

In practice, upon driving the motor, the drum 21 unwinds or winds the cable 22 which suspends the load and the first detection means 51 are designed to detect how much cable 22 is unwound and therefore determine, instant by instant, the relative position of the hook 23, and consequently of the load, relative to the winch 2.

Since the load is positioned immediately below the hook 23, it is possible to approximate its position to that of the hook 23; this does not mean that it is not possible for the control unit 3 to take into account a correction factor which compensates for the distance between the hook 23 and the load.

Preferably, the telehandler 1 includes electronic processing means 3, which consist of or comprise the above-mentioned processing unit 3, to which is connected a sensor 51 included in said first detection means, designed to produce a first signal as a function of the quantity of cable 22 unwound. The first sensor 51 may be applied to the drum 21 of the winch 2 and be, for example, designed to count the number of revolutions and their direction; the first sensor 51 may be an encoder, a potentiometer or other sensor suitable for the purpose.

The telehandler 1 also comprises second detection means 52, 53 to determine a relative position of the arm 10 and a quantity of elongation of the arm; in practice, the relative position may be the angular position of the arm 10 relative to the carriage 11 of the telehandler 1 or its equivalent.

The second detection means may comprise a second and a third sensor 52, 53 designed to produce, respectively, a second signal, as a function of the angular position of the arm 10 and a third signal, as a function of the quantity of elongation of the arm; the sensors 52, 53 are also connected to the electronic processing means 3.

For example, the second sensor 52 may be a potentiometer or an encoder, or other equivalent means; the third sensor 53 may also be a potentiometer or an encoder connected to a reel on which is wound a cable one end of which is fixed to a distal portion of the operating arm 10.

The processing means 3 can comprise a position module 31 configured to determine, instant by instant, the position of the hook 23 of the winch 2, on the basis of the values of said first, second and third signals.

Moreover, the processing means 3 can include a memory module 32 which is connected to the position module 31 and in which characteristic parameters of the telehandler 1 are recorded, for example of a geometrical type; in detail, these characteristic parameters represent preferably the dimensional and geometrical characteristics of the telehandler 1, such as the height of the carriage 11 above the ground, the position of the hinge of the arm 10 and its dimensions, etc.

In this case, the position module 31 is configured to determine, instant by instant, the distance of the hook 23 (and therefore of the load) from the ground, on the basis of the characteristic parameters of the telehandler 1, the angle of the arm 10, its length and the relative position of the hook 23 (that is, based on the above-mentioned signals).

For this reason, advantageously, the invention makes it possible to determine where the load is located during the working operations performed by the telehandler 1, which makes it possible to make available to the operator new functions described below.

It should be noted that what is stated above with regard to the processing means 3 applies to what has been stated for the above-mentioned processing unit 3, or "control unit", and vice versa, as the second is a particular type or a component of the first.

Generally speaking, it should be noted that, in this description, the processing unit 3 (and therefore the above-mentioned processing means) is presented as divided into separate functional modules solely for the purpose of describing the functions clearly and completely.

In practice, the processing unit 3 may be constituted by a single electronic device, also of the type commonly present on this type of telehandler, suitably programmed to perform the functions described; the various modules can correspond to hardware units and/or software routines forming part of the programmed device.

Alternatively or in addition, the functions can be performed by a plurality of electronic devices on which the above-mentioned functional modules can be distributed.

Generally speaking, the processing unit 3 may have one or more microprocessors or microcontrollers for execution of the instructions contained in the memory modules and the above-mentioned functional modules may also be distributed on a plurality of local or remote calculators based on the architecture of the network in which they reside.

The processing unit 3 may comprise or be connected to acquisition means designed to acquire one or more constraining parameters, corresponding to respective spatial limitations and configured for producing one or more limiting signals, as a function of the constraining parameters; the limiting signals are designed to determine constraints to the operation of the winch 2 and of the actuator means.

The limiting signals are received from a control module 33 of the processing unit 3 which consequently constrains the actuation of the actuators 101, 102, 24 of the telehandler 1.

The constraining parameters are in particular geometrical-spatial parameters which define spatial constraints for actuating the arm 10 and the winch 2 relative to predetermined references, such as, for example, the ground level and/or a system of coordinates centred at a fixed point of the telehandler 1.

Examples of these parameters are (or correspond to, are associated with): the height above the ground of the load (that is, of the hook 23), the length of the cable 22, the angle formed by the arm 10 with the carriage 11, the length or elongation of the arm 10, or also the distance of the load (or hook 23) from the carriage 11 (or other reference), which is determined trigonometrically by the angle and the length of the arm.

More specifically, the acquisition means may include a user interface 42 which allows the operator to enter or select limiting parameters.

In detail, the interface may be accessible from inside the driver's cab 12, for example by means of a touchscreen display 42, acting on graphic indexes or by means of more traditional commands such as knobs, pushbuttons or levers.

The user interface 42 may be configured to select the desired spatial constraint between a plurality of preset spatial constraints and recorded in the memory module 32, using a menu of choice or the like and/or to allow the operator to set the desired constraints, on the basis of the specific context in which the telehandler 1 is to operate at the moment.

The user interface 42 is therefore able to transmit limiting signals to the processing unit 3, in particular to the control module 33, as a function of the choices made by the operator.

Optionally, the processing unit 3 can include a setting module 34 configured for recording in the memory module 32 a certain position of the load (that is, of the hook 23, in the direction already explained) which has been set by the operator, using the interface means 42, thereby defining it as the predetermined arrangement.

Preferably, the processing unit 3 comprises a calculation module 35, to which the control module 33 is connected, configured to determine, as a function of the above-mentioned position associated with the load and the above-mentioned limiting signals, the mode of adjusting the operation of the actuating means and the winch 2.

In other words, by means of the above-mentioned interface 42, the operator can select or set "rules" or constraints relative to the position of the load and the processing unit 3 ensures that the actuators (cylinders of the arms 101, 102 and motor 24 of the winch 2) are activated in such a way that, whatever the commands issued by the operator, the established rules are always complied with.

In detail, the calculation module 35 is configured to determine, instant by instant, how the control module 33 must adjust the operation of the actuation means 101, 102, 24, so that the distance of the load relative to the ground is always kept constant, regardless of how the operator actuates the control means 41.

A constraining parameter is therefore constituted or is a function of the distance from the ground of the load; this distance may be a distance selected by the operator through the interface 42, amongst some pre-recorded in the memory module 32 or recorded by the setting module 34, or it may be a distance set at the moment by the operator or it may be the current height of the load, at a certain time.

An example of operation of the invention is illustrated below, with the aid of FIGS. 2 and 3.

Let us assume that the operator has to keep constant the height H of the load, reached during the operating operations of the telehandler 1.

As explained above, the position module 31 calculates instant by instant the value of the height of the load above ground, which is therefore a known data and which can also be made known to the operator using the interface 42.

For this reason, he/she decides to "fix" that height using the user interface 42 and this will be recorded in the memory module 32 and then used by the control module 33.

It is also assumed that, in more detail, the operator wishes not only to keep constant the height of the load H above ground but also to keep constant the distance X of the load from the carriage (see FIG. 2); as no load is shown in this drawing, it is easily possible to consider the height at which the hook 23 is located, for the reasons already explained.

Figure 2:
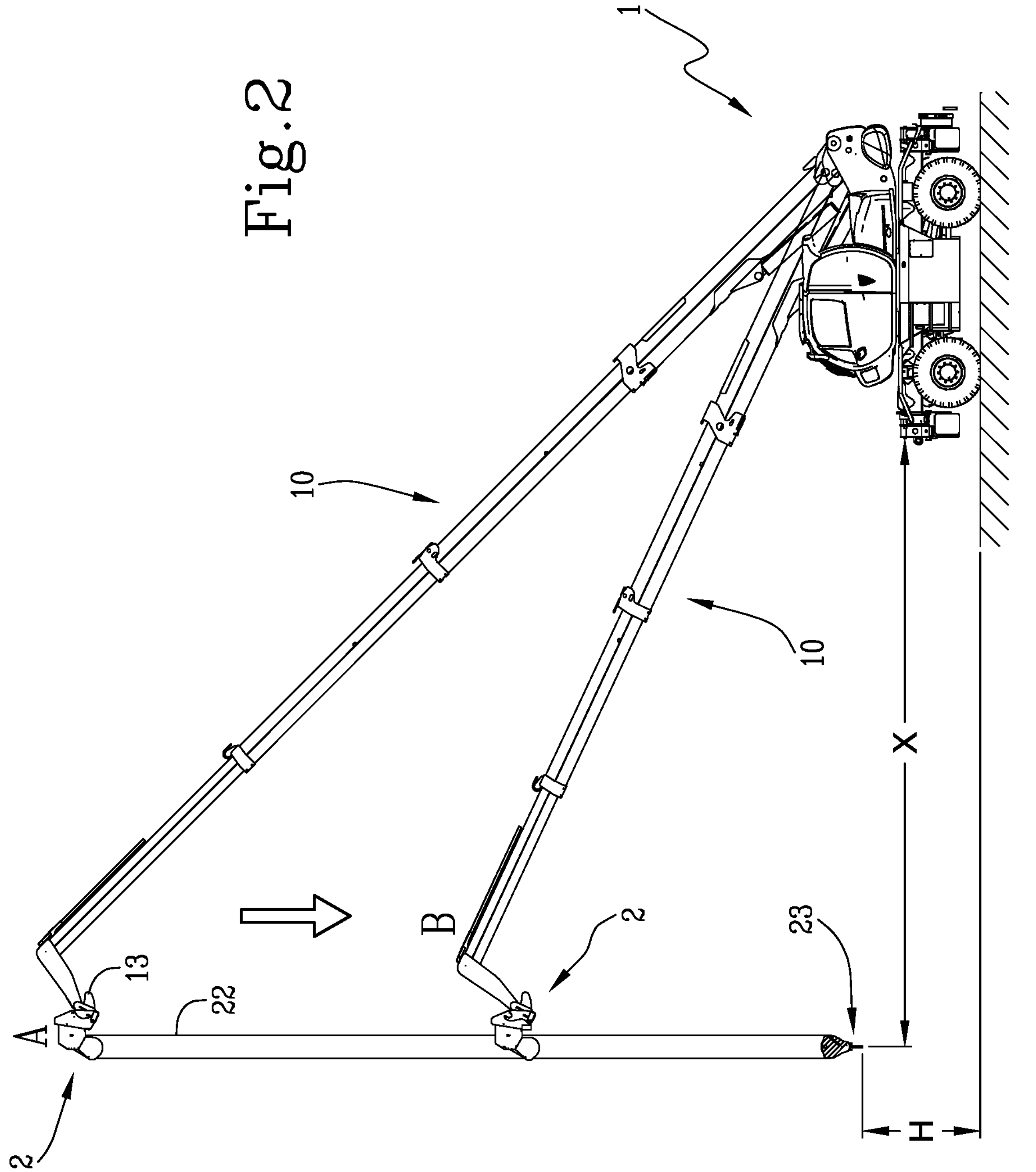
FIG. 2 and FIG. 3 are side views of the telehandler of FIG. 1, shown in different operating configurations.

In particular, in the example shown in FIG. 2, the operator decides to move the arm 10 down from the position A to the position B, with the aim that the height H of the load above the ground and the relative distance X from the carriage 11 do not change.

Following operation of the joystick 41 or other control means, the control module 33 of the processing unit 3 will produce suitable control signals which will be received from the hydraulic distributor 103 for controlling the actuator cylinders 101, 102 of the arm 10, for the purpose of the lowering.

Whilst the vertical oscillation cylinder 101 of the arm 10 allows the lowering of the arm 10 and the sensor 52 associated with the angular position of the arm 10 transmits to the processing unit 3 the above-mentioned second signal, the calculation module 35 determines how much the operating arm 10 must be shortened and how far the cable 22 of the winch 2 must be re-wound to compensate for the descent of the arm 10.

Therefore, the control module 33, on the basis of the determinations of the calculation module 35 to which it is connected, will produce control signals which will control the distributor 103 in such a way that it actuates both the cylinders 102 of the telescopic segments of the arm 10 in such a way as to withdraw it by the suitable length and the motor of the winch 2 to wind the cable 22.

Figure 3:
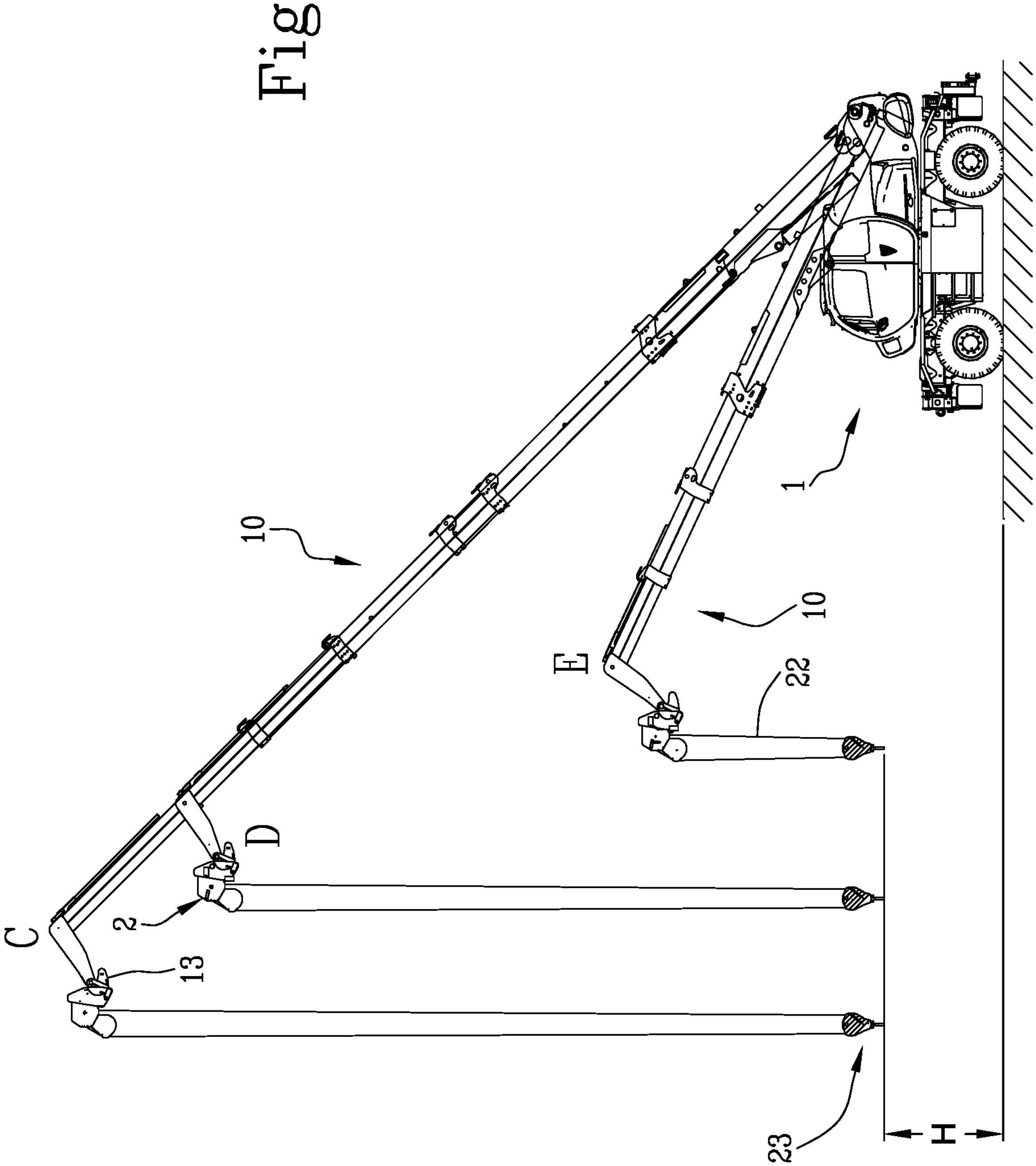

If, on the other hand, the operator wishes to move the load towards or away from the carriage 11, keeping constant the height above ground H, the telehandler 1 may, for example, be controlled so that the arm 10 and the apparatus pass through the positions C, D and E of FIG. 3 according to the following mode.

Starting from the position C, the operator can command a shortening of the arm 10 with the constraint of the constant height of the load, with the processing unit 3 designed to compensate with a winding of the cable 22; the operator can then control a lowering with simultaneous approach of the load and the processing unit 3 will compensate by rewinding the cable 22 even more and shortening further the arm 10.

The invention claimed is:

1. A telehandler comprising an operating arm to which is coupled a winch equipped with a motor-driven drum, on which is wound a cable to which is fixed a hook, a first sensor for detecting a quantity of a cable unwound, the first sensor being configured to produce a first signal as a function of the quantity of the cable unwound, a second sensor for determining a position of the operating arm, the second sensor being configured to produce a second signal as a function of the position of the operating arm, a third sensor for determining the quantity of elongation of the operating arm, the third sensor being configured to produce a third signal as a function of the quantity of elongation of the operating arm, an electronic processor, the electronic processor comprises a positioner and a memory module, the memory module configured to record geometric characteristics of the telehandler, the positioner configured for determining a distance of the hook from the ground on the basis of the recorded geometric characteristics, the first, the second and the third signals, a plurality of actuators that produce an elongation or a retraction of the operating arm and a raising or lowering of the operating arm, the electronic processor further comprises a controller configured for producing control signals to adjust an operation of the winch and the actuators, the electronic processor further comprises a calculator, to which the controller is subject, configured to determine, instant by instant, how the controller must adjust the operation of the winch so that a height of a load relative to the ground is always kept constant, regardless of how an operator operates a joystick connected to the electronic processor for controlling the controller.

2. The telehandler according to claim 1, comprising a user interface configured to acquire, via the operator, one or more constraining parameters corresponding to spatial limitations and configured to produce one or more limiting signals as a function of the constraining parameters which are designed to determine constraints to the operation of the winch and of the plurality of actuators.

3. The telehandler according to claim 2, wherein the user interface allows the operator to set and/or select said constraining parameters.

4. The telehandler according to claim 2, wherein the the calculator is configured for determining, as a function of one or more limiting signals, an adjustment of the operation of the plurality of actuators and of the winch.

5. The telehandler according to claim 1, wherein the winch is equipped to the distal end of the operating arm.

6. The telehandler according to claim 1, wherein the geometric characteristics recorded by the memory module include height of a carriage of the telehandler above the ground.

* * * * *